United States Patent [19]

Anderson

[11] Patent Number: 4,628,634
[45] Date of Patent: Dec. 16, 1986

[54] NURSERY STOCK CONTAINER

[76] Inventor: Oren B. Anderson, 589 Havana Rd., Owatonna, Minn. 55060

[21] Appl. No.: 686,027

[22] Filed: Dec. 24, 1984

Related U.S. Application Data

[63] Continuation-in-part of Ser. No. 570,268, Jan. 12, 1984.

[51] Int. Cl.⁴ .............................................. A01G 23/02
[52] U.S. Cl. ............................................ 47/73; 47/84
[58] Field of Search ................. 47/66, 73, 74, 84, 85, 47/77; 229/21, 5.7; 411/501; 220/5 R

[56] References Cited

U.S. PATENT DOCUMENTS

| | | | |
|---|---|---|---|
| 861,046 | 7/1907 | Norum | 47/73 |
| 1,959,800 | 5/1934 | Rogge | 47/66 |
| 2,100,773 | 11/1937 | Boeye | 229/5.7 |
| 2,562,721 | 7/1951 | Jakosky | 411/501 |
| 2,594,307 | 4/1952 | Valenzuela | 47/73 |
| 2,758,419 | 8/1956 | Schmitz | 47/73 |
| 2,833,087 | 5/1958 | Wedding et al. | 47/73 |
| 2,968,124 | 1/1961 | Coplen | 47/73 |
| 3,147,569 | 9/1964 | Murguia | 47/73 |
| 3,313,333 | 4/1967 | Lordi | 47/73 |
| 4,113,093 | 9/1978 | Hendrickx | 47/84 |

Primary Examiner—Robert A. Hafer
Assistant Examiner—Bradley M. Lewis
Attorney, Agent, or Firm—Merchant, Gould, Smith, Edell, Welter & Schmidt

[57] ABSTRACT

The present invention is a nursery stock container which is disassembled, at the time the plant is transplanted, in a manner which does not cause damage to the root ball of the plant. Each container has a wall member with spaced slots formed therein near a bottom edge and a base with an upstanding peripheral flange and peripheral tabs extending through the slots, which are removably secured together to form a cylindrical enclosure. To support the wall member and maintain the cylindrical configuration various retaining mechanisms may be used, each of which may be readily removed and disposed of at the time of transplanting.

27 Claims, 13 Drawing Figures

NURSERY STOCK CONTAINER

This is a continuation-in-part of Ser. No. 570,268 filed Jan. 12, 1984.

TECHNICAL FIELD

The present invention relates to nursery stock containers and more particularly to those which may be disassembled without damage to the root ball of the plant at the time of transplanting.

BACKGROUND

When plants are grown in a nursery setting, it is necessary to provide a container for the soil, which ultimately forms with the roots of the plant, a root ball. Nursery stock of this type may be transferred from one location to another several times before the plant is purchased and transplanted in a permanent location. It is during the transplanting phase of the process that care must be taken to prevent damage to the root ball which might kill or stunt the growth of the plant. Separating the plant from the stock container or during the above transfer operations is generally when damage to the root ball occurs, and it is these reoccurring problems to which the present invention is directed.

Nursery stock containers which may be disassembled at the transplanting site are well known in the art. However, to date such containers have either not adequately eliminated the chances that damage will occur to the root ball during the disassembly process and the transfer process or the manufacture requirements for such containers, for a variety of reasons, prevents their usage on a wide scale in the industry. For example, nursery stock containers made of metal are expensive to manufacture and maintain. The nature of their construction necessarily places limitations on how the container may be removed from the rootball at the transplanting site. Further, such containers are cumbersome which only adds to their inadequacy as a container when the container must be removed. Prior art containers made from materials such as pressed fiberboard or paper are generally not reusable. Such containers are often times not sufficiently durable to withstand the rigors of the nursery setting where stock is transferred about and finally shipped to the transplanting destination. The above is particularly true of heavier plants wherein the plant may be generally in the weight range of over 200 pounds with a root ball of a size which requires a container with two gallons or more of capacity. Further, if such a container is left to surround the root ball after transplanting in the ground, the growth of the plant is necessarily retarded until the fibers of the container material deteriorate to the degree necessary to allow the roots to be freed from the ball and extend into the surrounding soil.

Thus, problems exist with available nursery stock containers which not only inconvenience the user but also fail to prevent damage to the root ball of the plant at the time of transfer or transplanting. The present invention, however, brings to the state of the art for nursery stock containers solutions to both the manufacturing and use problems of the prior art containers. As will be appreciated from the drawings and a reading of the description which follows, the manufacturing requirements for the present invention are minimal, the resulting structure is durable, and certain portions are reusable. The methods for assembling and disassembling the invention allow unskilled persons to use the invention with ease and without causing damage to the root ball. These and other features and advantages of the invention are explained more fully in the specification which follows.

SUMMARY OF THE INVENTION

The invention relates to nursery stock containers which are safely transferable in the nursery and which are disassembled at the transplanting site in a manner which does not cause damage to the root ball of the plant or tree. The various parts of the container may be shipped and stored separately with a minimum of storage space being required. When the containers must be assembled for use, such assembly may be accomplished quickly and with minimum effort on the part of the user.

One such container has a base provided with a plurality of ears or tabs. A flat, substantially rectangular wall member is constructed so as to have a plurality of slots or openings along one edge so that when the wall member is curled around a respective base, each of the tabs of the base is received by a corresponding slot in the wall member. The resulting structure is a cylindrical enclosure wherein the base closes one end of the closure, the wall member forms an upstanding continuous wall and the upper end of the enclosure is open. To maintain the cylindrical nature of the enclosure a variety of mechanisms may be used either singly or in combination depending on weight and size variables. Each mechanism is removable at the time of transplanting. The mechanism may be severable rivets which hold overlapping ends of the wall member together, an outer sleeve which telescopes over the curved wall member, or a strap-like band secured around the exterior surface of the wall member generally at a location where the greatest stress will be exerted on the wall member by the root ball. Handle grips may be provided at the upper end of the wall member for ease in transporting the plant from one location to another.

A second container is substantially identical to the first container except that the base includes an upstanding peripheral flange for added strength. Ears or tabs of the base are formed on the flange to be received in slots or openings formed in the wall member so as to position the base below the lower edge of the side wall for added support of a root ball when the wall member is curled around the base. Like the first container, a variety of mechanisms, removable at the time of transplanting, may be used to maintain the cylindrical shape of the enclosure. The mechanism may be severable rivets and/or a strap-like band secured around the exterior surface of the wall member adjacent the ears or tabs where the greatest stress will be exerted on the wall member by the root ball.

When the plant is to be transplanted, one of the containers is inserted with the plant into the prepared site. The container is then disassembled by removing the enclosure retainer mechanism and unrolling the wall member from around the root ball and apart from the base. The base of the container remains with the undisturbed root ball and the transplanting is completed in the usual manner. The removed wall member may be reused with a new base and retainer mechanisms.

DETAILED DESCRIPTION OF THE INVENTION

Figures 1, 2, 4:
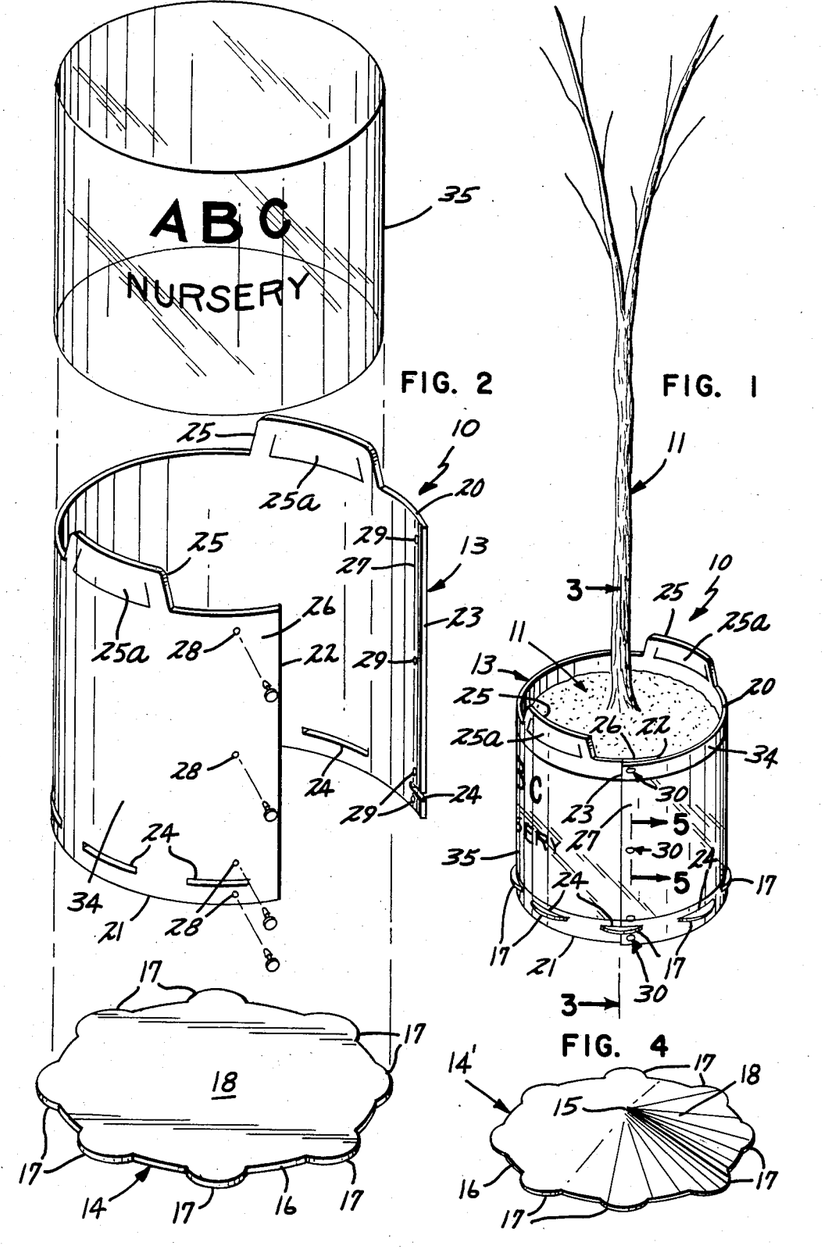
FIG. 1 is a perspective view illustrating one embodiment of the invention as assembled and in use as a container for nursery stock.
FIG. 2 is an exploded view in perspective of the various parts of the invention.
FIG. 4 is a view in perspective of an alternative embodiment for the base of the invention.

In the drawings like reference numerals are used throughout the several views to indicate the same or like elements of the invention. Referring to FIG. 1, a first embodiment of the invention is shown as it would typically appear in use in a plant nursery. The invention is assembled as a container 10 for the soil and the roots of the plant 11 which form what is termed in the trade a "root ball" 12. It is the root ball 12 which is ultimately transplanted at a permanent site and determines the resulting growth of the plant.

Referring now to FIG. 2, the various parts of the invention are shown in an exploded view. Each container 10 has a wall member 13 and a base 14 which together form a cylindrical enclosure for containing soil and the roots of the plant. In FIG. 2, a flat base 14 is shown; however, an alternate type base 14' is shown in FIG. 4 in which the base 14' is conical in shape having an apex portion 15 which extends upwardly within the enclosure. The conical base 14' can be stamped from a flat sheet of metal and because of its shape will be stronger than the flat base 14. Each base 14, 14' is preferably circular and thus has an edge periphery 16. Extending radially from and along the length of the edge periphery 16 are a plurality of spaced apart ears or tabs 17. Each ear or tab 17 may be formed integral with the central body 18 of the base 14. The material from which the base is constructed may be metal, plastic or any other suitable material which has sufficient strength and integrity to support the root ball 12 during the time the plant is being grown in the nursery stock container.

Each container 10 of the present invention also has a wall member 13 which together with the base 14 forms the container 10, i.e., a cylindrical enclosure. The preferred wall member 13 is rectangular in shape and lies flat for shipment and storage. Each wall member 13 has a top edge 20, a bottom edge 21 and a pair of opposing side edges 22, 23, each of which extends from the top edge 20 to the bottom edge 21. To secure the wall member 13 about the base 14 a plurality of spaced slots or openings 24 are formed in the wall member 13 at locations near the bottom edge 21 of the member 13. Such locations are predetermined by the spacing of the ears or tabs 17 on the base 14 to which the particular wall member 13 will be secured. Also, the size of each slot will be determined by the size of the base tabs 17 to be received therein. As the wall member 13 is intended to be reused a number of times, a preferable material for its construction is any type of flexible yet durable plastic. At the time of molding or manufacture hand grips 25 may be provided at the top of the member. Such grips 25 may be formed integral with the wall member or may be separately manufactured and applied to the wall member. The grips 25 shown are formed integrally with the wall member and include a flat portion 25a formed by cutting the handle opening along the bottom and two side edges, leaving the top attached so that the user can fold out the flat portion 25a to provide a more comfortable, rounded handle.

When the tabs 17 of the base member 14 are each inserted into a slot 24 in the respective wall member 13, the wall member 13 will be wrapped about the base 14. Because the tabs are longer than the thickness of the wall member 13 the tabs 17 will protrude from the slots 24 when the enclosure is assembled. The length of the wall member 13 is such that side edge portions 26, 27 overlap each other to provide an uninterrupted wall for the resulting enclosure, see FIG. 6. The wall member as secured to the base 14 forms a cylindrical enclosure with the base being perpendicular to the longitudinal axis of the enclosure and closing off one end of the enclosure.

Figures 5, 6:
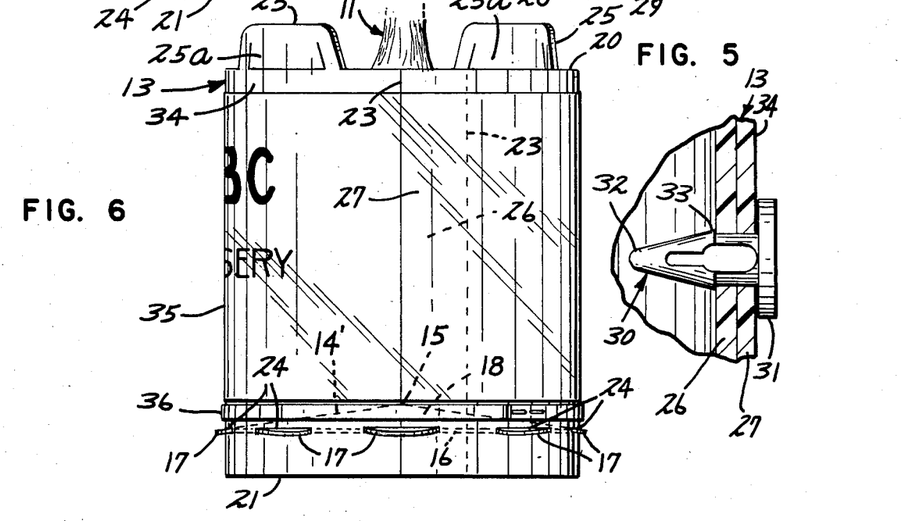
FIG. 5 is a view in cross section of one mechanism for retaining the wall member of the invention in a cylindrical configuration as generally seen along lines 5—5 in FIG. 1.
FIG. 6 is a view in elevation of the invention as assembled and used as a nursery stock container.

The top edge 20 of the wall member 13 defines an open end of the enclosure opposite the closed end or base. To maintain the cylindrical configuration when a plant is potted in the container, a mechanism is provided which may be readily removed at the time of transplanting. In FIGS. 1-6 of the drawings three types of mechanisms are shown. In FIG. 2 it can be seen that the edge portions 26, 27 of the wall member 13 which will overlap each other are provided with a plurality of holes 28, 29 along the length of each portion 26, 27 respectively. The holes 28, 29 are spaced apart and located such that when the wall member is positioned about the base 14 and the edge portions 26, 27 overlap each other the respective holes 28, 29 in each portion will be aligned along the length of the overlapped area. Into each of the aligned pairs of holes a snap-in rivet 30 is inserted. In FIG. 5 a preferred rivet is shown in cross section. The rivet 30 is of conventional design and commercially available. It may be made of a plastic which will allow it to be cut or severed just below its head portion 31. The rivet is manually forced through a pair of aligned holes. The rivet will "give", i.e. be compressed to allow the tapered end 32 of the rivet to pass through both holes. The portion 33 of the rivet which is of greater diameter than the holes will prevent the rivet from passing back through the holes. Thus the head 31 of the rivet 30 remains on the exterior surface 34 of the wall member 13 with the remaining portion of the rivet extending through the overlapping wall member portions and into the interior of the enclosure. The number of rivets necessary will be determined by the size of the wall member.

A second type of mechanism, which may be used with or instead of the rivets and/or strap to maintain the cylindrical enclosure, is also shown in FIG. 2. A tubular cover member or outer sleeve 35 made of a flexible material is provided. This member or sleeve 35 is preferably constructed from a polyethylene film and has a continuous or one-piece construction. The diameter of the tubular member 35 will be determined by the size of the wall member 13 which it must surround. It is intended that the tubular member 35 be of a diameter slightly larger than that of the enclosure to fit snugly about the cylindrical enclosure in telescoping fashion as can be appreciated from a study of FIGS. 2 to 6. FIG. 6 illustrates the close fitting relationship of the tubular member 35 and wall member 13. The advantage of using this type of mechanism is that it will provide support to the enclosure along the full height of the member as well as providing a surface upon which may be printed, e.g. by silkscreening, store advertisements or other planting instructions. The type of material selected should be a type which may be readily slit with a knife or scissors and then discarded.

A third type of mechanism which may be used to maintain the cylindrical configuration of the enclosure as well as providing support to the wall of the enclosure is illustrated in FIG. 6. There it may be seen that a strap-like member or band 36 is secured about the outer or exterior surface 34 of the wall member 13 at a location wherein the greatest stress might be exerted by the root ball 12 upon the container 10. Typically this location is in the lower part of the container, and in this embodiment of the invention the band 36 is positioned immediately above and directly against the base tabs 17 protruding from the slots 24 in the wall member 13. As with the tubular member or sleeve 35, the strap-like band 36 may be slipped onto the container in telescoping fashion, or it may be constructed as a length of material whose ends are not secured together, e.g. by stapling, until it is positioned around the container wall member 13. The band 36 is intended to be made from a material, e.g. plastic, which may be readily cut to release it at the time the plant is transplanted.

From a study of FIG. 6 it can be appreciated that the base 14 is located a distance above the surface upon which the enclosure rests. Thus, the bottom edge 21 of the wall member 13 rests directly upon a supporting surface with an air space or void existing between the exterior side of the base 14 and the supporting surface located directly below.

From the foregoing it can be appreciated that a number of combinations are possible for assembling the invention. If the root ball of the potted plant is relatively small it may be sufficient to use only the wall member 13, base 14 and rivets 30 for constructing the enclosure, or, in the alternative, to use a base 14, wall member 13 and both the tubular member 35 and strap-like band 36. If the root ball 12 of the potted plant is relatively large it may be necessary to use, in combination with the outer wall member 13 and base 14, the rivets 30 and retainer band 36, as well as the outer sleeve or tubular member 35.

Referring back to FIG. 2, the method for assembling the container or enclosure 10 will be explained. A base 14, whether flat or conical, and a wall member 13 corresponding appropriately in size to the base 14, are selected. The wall member 13 is curled around the base 14 such that each of the tabs 17 of the base 14 passes through and is held by a respective slot 24 in the wall member 13. The resulting cylindrical configuration of the wall member is then maintained by using either the rivets 30, as explained above, an outer sleeve 35, and/or a strap-like band 36. Following this, a plant may be potted in the container 10 and remains in the container 10 until it is time to transplant the root ball 12.

Figure 3:
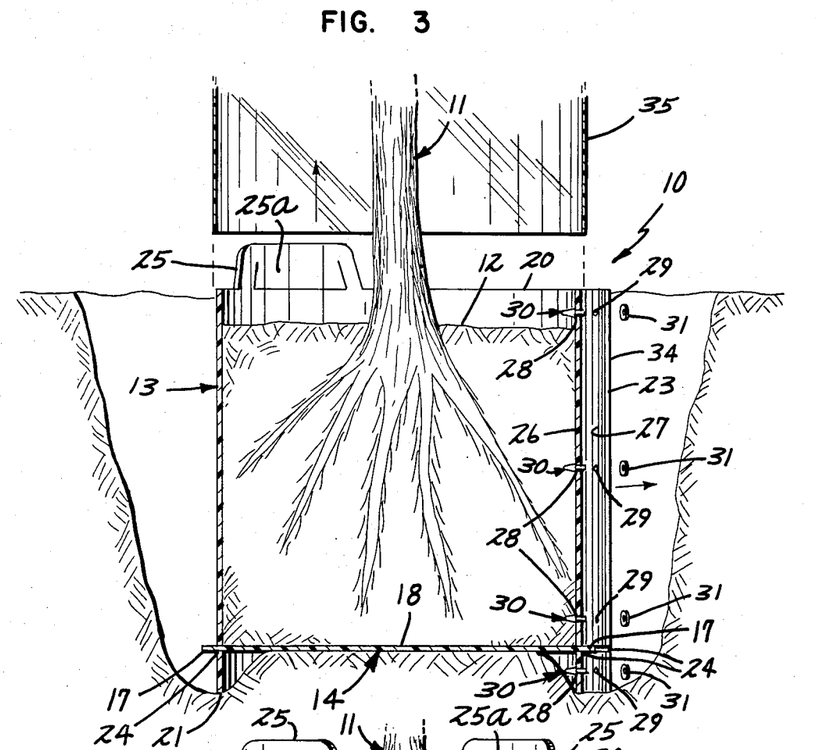
FIG. 3 is a view in cross section of the invention as generally seen along lines 3—3 in FIG. 1.

Turning now to FIG. 3, the advantages of the first embodiment of the invention over the prior art can be appreciated. When it is desired to transplant the potted plant into the ground, a hole is dug into which the container 10, containing the root ball 12, is placed. If an outer sleeve 35 is used around the wall member it is slit and pulled away or it may be pulled up and off the enclosure as shown in FIG. 3. Next, the head 31 of each rivet 30 is cut or severed from the remaining body portion of the rivet. Or if a band 36 is used, it is broken, cut or otherwise lifted off the container 10. The wall member 13 may then be unrolled from around the root ball and released from its connection with the base 14. Separation of the wall member 13 from the base 14 is accomplished without disturbing or damaging the root ball 12. The wall member 13 is then removed from the hole and is cleaned or otherwise readied to be used again with a new base 14. The base 14 underlying the root ball 12 is left in the ground and planted with the root ball.

When handling plants of a very large nature, e.g. on the order of approximately 200 pounds or more, or with root balls which may require containers of approximately two gallons or more capacity, it has been found necessary to provide a more sturdy container apparatus. Because the container 10 rests upon the lower edge 21 of side wall 13 during the nursery growing period, very large plants tend to deform the lower edge area resulting in displacement of the tabs 17 from the slots 24 and ultimately the bottom 14 from wall member 13. This is particularly true if the container 10 is being moved and thereafter set down in a manner wherein one side of the edge 21 engages the ground first. This can cause a severe weight shift of the root ball 12 in the container 10 resulting in displacement of some tabs 17 from slots 24. The preferred structure hereinafter described not only alleviates the above problem, but provides a container which may be used with smaller size plants and is still adaptable to efficient storage and shipping of knock-down or disassembled containers.

Figures 7, 8, 9, 10, 11, 12, 13:
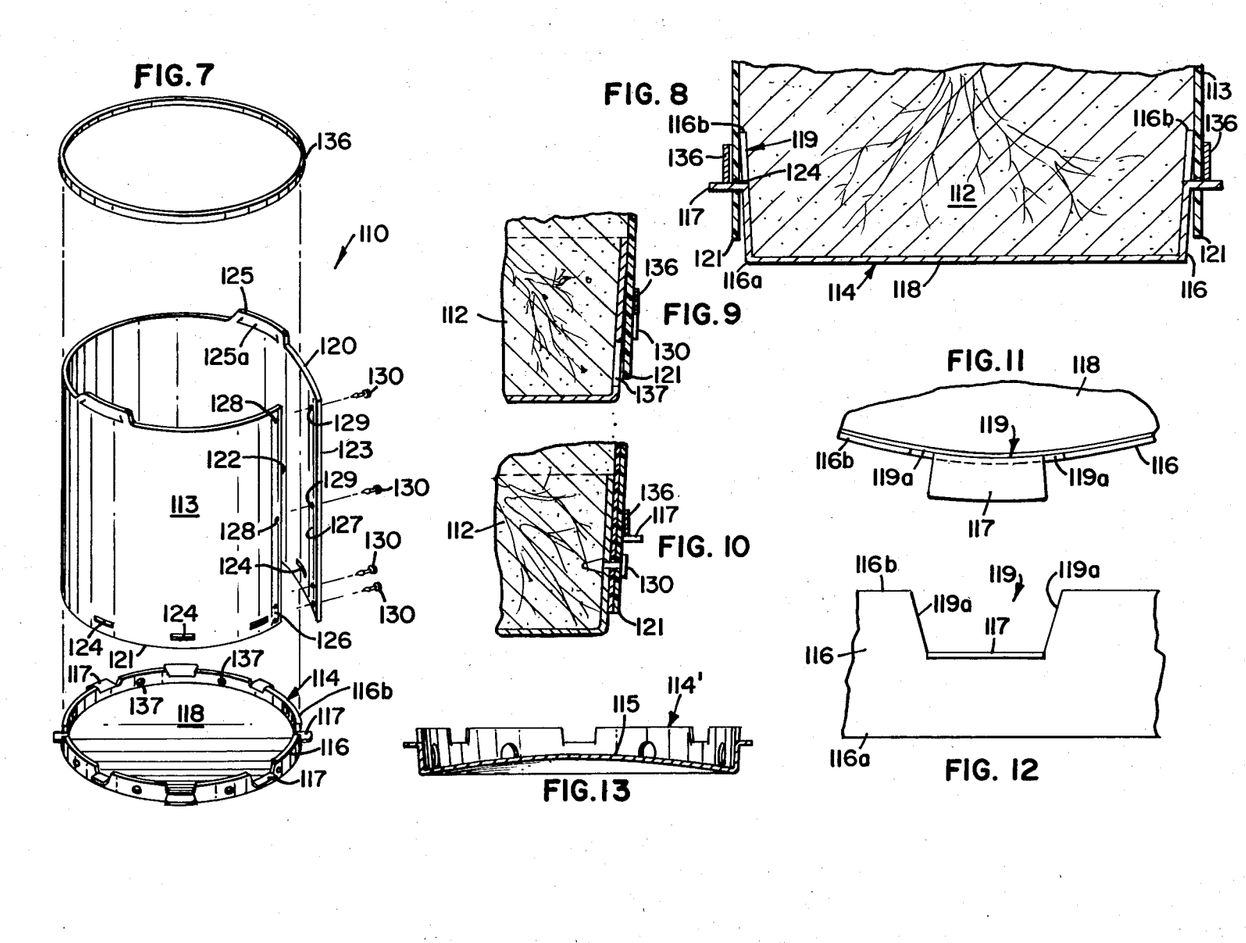
FIG. 7 is an exploded perspective view similar to FIG. 1 showing a preferred embodiment of the invention.
FIG. 8 is an enlarged fragmentary sectional view similar to a portion of FIG. 3, showing the preferred base of FIG. 7.
FIG. 9 is a fragmentary sectional view corresponding to a portion of FIG. 8 but showing a drainage opening in the base thereof.
FIG. 10 is a fragmentary sectional view similar to FIG. 9 but showing the base and wall member in the vicinity of a severable rivet.
FIG. 11 is a fragmentary view in top plan of a base tab.
FIG. 12 is a side elevational view of FIG. 11.
FIG. 13 is a sectional view showing a still further alternative embodiment of the base of the present invention.

In the preferred embodiment as shown in FIGS. 7-13, a heavy-duty container is indicated generally by the reference numeral 110. Parts of container 110 similar to parts of container 10 will carry like reference numerals with the numeral 100 added thereto. Referring more particularly to FIG. 7, each heavy-duty container 110 is shown as including a wall member 113 and a circular shaped base 114 which together form a cylindrical enclosure for containing soil and the root system, commonly known as a root ball, of a plant. The structure of the wall member 113 is basically the same as previously described, but each base 114 includes a planar, circular central portion 118 and peripheral support means comprising an upstanding, integrally formed, peripheral flange 116 extending therefrom. A plurality of radially extending tabs 117 are formed from the flange 116 at circumferentially spaced points on the flange 116. As shown in FIG. 8, the flange 116 has a bottom edge 116a and the central portion 118 is flat and lies in a plane defined by the bottom edge 116a for a reason which will become apparent hereinafter. Also, for a reason which will become apparent hereinafter, flange 116 diverges outwardly and upwardly toward the top edge 116b of flange 116. While the central portion 118 together with the flange 116 forms a stronger base 114 than the base 14 of container 10, an even stronger base may be formed by providing a base 114' having a concave central portion 115 which is disposed in or toward the cylindrical enclosure, see FIG. 13. As seen particularly in FIGS. 7, 11 and 12, each tab 117 is formed by cutting the flange 116 at its top edge 116b in a downward direction at circumferentially spaced points and by bending a portion between the cuts radially outwardly. A notch 119 is thus formed at each tab 117 between the tab 117 and top edge 116b of flange 116. As shown, each notch has side edges 119a which diverge toward the top edge 116b. This construction together with the diverging nature of flange 116 enhances or permits the nesting reception of other bases 114 in a stacked arrangement for storage or shipping purposes. It will be herein noted by particular reference to FIG. 11 that tab 117 at its juncture with flange 116 conforms in shape with the circular shape of flange 116. This provides a better stacking shape to the flange 116.

Each container 110 of the heavy-duty, preferred embodiment of the present invention also has a wall member 113 which together with the base 114 forms the container 110, i.e. a cylindrical enclosure. The preferred wall member 113, as in the case of container 10, is rectangular in shape and lies flat during shipment or storage. Each wall member 113 has a top edge 120, a bottom edge 121 and a pair of opposing side edges 122, 123 each of which extends from the top edge 120 to the bottom edge 121. To secure the wall member 113 about the base 114, a plurality of spaced slots or openings 124 are formed in the wall member 113 at locations near the bottom edge 121 of the member 113. Such locations are predetermined by the spacing of the ears or tabs 117 on the base 114 to which the particular wall member 113 will be secured. It will be noted that slots 124 are spaced from the edge 121 of wall member 113 a distance whereby the edge 121 is positioned above the juncture of the central portion 118 with the bottom edge 116a of flange 116 for a reason hereinafter explained. Also, the size of each slot 124 will be determined by the size of the base tab 117 to be received therein.

As the wall member 113 is intended to be reused a number of times, a preferable material for its construction is any type of flexible yet durable plastic.

When the tabs 117 of the base 114 are each inserted into a slot 124 in the respective wall member 113, the wall member 113 will be wrapped about the base 114. Because the tabs are longer than the thickness of the wall member 113, the tabs 117 will protrude from the slots 124 when the enclosure is assembled. In FIG. 7 it can be seen that the edge portions 126, 127 of the wall member which will overlap each other are provided with a plurality of holes 128, 129 along the length of each portion 126, 127 respectively. Into each of the aligned pairs of holes 128, 129 a snap rivet 130 is inserted.

A second type of mechanism which may be used to maintain the cylindrical configuration of the enclosure as well as provide support to the wall of the enclosure is illustrated in FIG. 7. The strap-like band 136 may be slipped onto the container in telescoping fashion to a position adjacent the protruding base tabs 117, or it may be constructed as a length of material whose ends are not secured together, e.g. by stapling, until it is positioned around the container wall member. The strap is positioned above and against the tabs 117 which extend from the slots 124. It will be noted, by particular reference to FIG. 8 of the drawings, that the upstanding flange 116 forms a backup for the strap 136. The flange 116 is positioned within and supports an area of the wall member, and prevents inward movement or shifting of the wall 113 over a relatively wide band adjacent the bottom edge 121 of wall 113. Thus, it is much more difficult to dislodge the wall 113 from its desired position due to any shifting weights within the enclosure of the container 110 during movement thereof.

Normally it is desirable to provide drainage openings in either the wall member 113 or base 114 to remove excess water from the enclosure of the container 110. As shown in FIG. 7 of the drawings, the drainage openings 137 are formed in the upstanding flange 116 intermediate each of the base tabs 117.

Because of the positioning of wall member 113 as well as the particular construction of base 114, a container 110 is provided wherein the weight of a root ball 112 in the container 110 does not rest on the bottom edge 121 of the wall member 113, or on the tabs 117, but is evenly distributed on the base 114. Because of the presence of the peripheral flange 116 the integrity of the cylindrical enclosure is maintained even though the container 110 may be dropped or set down in such a way that one edge of the base 114 engages the ground first. Assembly of the container 110, as well as transplanting procedures, are similar to those described above with respect to container 10 and will not be further discussed at this point.

The simplicity of design, minimum manufacturing requirements and ease with which the invention is used all combine to provide nursery stock containers which truly advance the state of the art. The invention not only fulfills the purpose of containing the root ball while the plant is in a nursery setting, but provides the equally important function of allowing the potted plant to be transplanted without damage occurring to the root ball as the container is removed. The fact that certain parts of the invention may be reused over and over while other parts of the invention are disposable is a feature which is desirable and yet not well known in the prior art.

Of course, modifications of the various parts of the invention in keeping with the teachings set forth above would be possible to those skilled in the art. Thus, the invention is believed limited only by the scope of the claims which follow.

What is claimed is:

1. Removeable apparatus for containing the root ball of a plant, comprising:
   (a) a rigid base (114) having a floor portion (118) and integral upwardly projecting support (116) and a plurality of integral circumferentially spaced tabs (117) projecting radially outwardly and with said floor portion (118), support (116) and plurality of tabs (117) being of unitary construction;
   (b) a wall member (113) of flexible material, having a top edge, a bottom edge, and a pair of opposing side edges, each of said side edges extending between said top edge and said bottom edge;
   (c) circumferentially spaced slots (124) in said wall member (113) proximate said wall member bottom edge for removably receiving said base tabs (117) in a manner which forms an enclosure with said wall member supported solely by said tabs;
   (d) means for securing portions of said wall member side edges together whereby said tabs (117) extend from said slots and said support (116) is positioned within and supporting an area of said wall member adjacent said bottom edge and with said wall member bottom edge spaced from said floor portion;

(e) said tabs (117) are spaced above said floor portion (118) and said slots (124) are spaced above said wall member bottom edge (121) a distance less than a distance between said tabs (117) and said floor portion (118) and said base is configured for said base not to present an annular surface opposing said bottom edge in force transmitting relation.

2. The apparatus of claim 1 wherein said tabs (117) are spaced above said floor portion (118) and said slots (124) are spaced above said wall member bottom edge (121) a distance less than a distance between said tabs (117) and said floor portion (118).

3. The apparatus of claim 2 wherein said upwardly projecting support has a bottom edge, and said floor portion of said base is flat and lies in the plane defined by said bottom edge.

4. The apparatus of claim 2 wherein said upwardly projecting support has a bottom edge, and said floor portion is upwardly concave so as to be disposed within said enclosure.

5. The apparatus of claim 1 wherein said base is circular in shape and said upwardly projecting support diverges outwardly and upwardly.

6. The apparatus of claim 5 wherein said upwardly projecting support comprises an upstanding peripheral flange having a top edge and wherein a notch is formed in said flange between each of said base tabs and said flange top edge.

7. The apparatus of claim 5 wherein said notches each include side edges which diverge from a respective tab toward said flange top edge.

8. The apparatus of claim 5 wherein said base tabs are formed integrally with said flange and wherein the juncture of each of said base tabs with said upstanding flange conforms in shape with the circumferential shape of said upstanding flange.

9. The apparatus of claim 8 wherein one of said base and wall member has a plurality of drainage openings formed therein.

10. The apparatus of claim 9 wherein said drainage openings are formed in said support intermediate each of said base tabs.

11. The apparatus of claim 1 wherein said wall member includes a pair of hand grips forming ears at spaced points adjacent said top edge of said wall member, said ears being located to be diametrically opposed when said wall member forms said enclosure.

12. The apparatus of claim 11 wherein each hand grip forming ear includes a bottom and two side edges, and wherein a hand receiving opening is formed in said ear by cutting said ear along said bottom and adjacent each of said side edges.

13. Removeable apparatus for containing the root ball of a plant, comprising:

(a) a rigid base having a central portion, integral upstanding peripheral support means, and a plurality of integral circumferentially spaced tabs extending radially outwardly from said support means and with said central portion, peripheral support means and said plurality of tabs being of unitary construction;

(b) a flexible wall member having top, bottom and side edges;

(c) a plurality of slots in said wall member proximate said bottom edge spaced to receive said tabs to form an enclosure with said tabs extending through said slots;

(d) said tabs being spaced above a juncture of said base central portion and said support means and slots being spaced above said wall member bottom edge and distance less than a distance between said tabs and said juncture with said wall member supported above said junction solely by said tabs;

(e) means for removeably securing said wall member side edges together to maintain said enclosure; and (f) said base is configured for said base not to present an annular surface opposing said bottom edge in force transmitting relation.

14. The apparatus of claim 13 wherein said means for securing said side edges together comprises a plurality of rivets extending through corresponding openings in overlapping side edges with said rivets presenting severable plastic heads exterior of said enclosure.

15. An apparatus for containing the root ball of a plant during growth of the plant in a nursery setting, said apparatus being adapted for separation from the root ball at the time the plant is transplanted in a manner not causing damage to the root ball, said apparatus comprising:

(a) a rigid circular shaped base having a central portion, an integrally formed rigid upstanding peripheral support and a plurality of rigid circumferentially spaced apart tabs formed integrally with and extending radially outwardly from said support and with said central portion, peripheral support and plurality of tabs being of unitary construction;

(b) a substantially rectangular wall member made of flexible material, having a top edge, a bottom edge, and a pair of opposing side edges, each of said side edges extending between said top edge and said bottom edge;

(c) circumferentially spaced slots in said wall member proximate said wall member bottom edge for removeably receiving said base tabs in a manner which forms a cylindrical enclosure with said member supported solely by said tabs, said enclosure having a closed end defined by said base, an inner cylindrical wall surface, an outer cylindrical wall surface, and an open end defined by said top edge of said wall member;

(d) said circumferentially spaced slots being spaced above said wall member bottom edge a distance less than a distance between said tabs and a juncture of said central portion and said support;

(e) means for maintaining the cylindrical shape of said enclosure, including a plurality of rivets adapted for securing portions of said wall member side edges together in overlapping fashion with said rivets presenting severable plastic heads on said outer cylindrical wall surface;

(f) said base is configured for said base not to present an annular surface opposing said bottom edge in force transmitting relation.

16. The apparatus of claim 15 wherein said means for maintaining said cylindrical shape further includes a strap-like band removeably positioned around said outer wall surface in close fitting relation thereto proximate said tabs protruding from said slots on an upper side of said tabs whereby said tabs aid to support said strap-like band about said wall.

17. The apparatus of claim 16 wherein said peripheral support abuts said inner cylindrical wall opposite said band whereby said support and said band cooperate to retain said wall member snugly between said support and band with said wall member having a circular shape at said band protected from deformation.

18. The apparatus of claim 13 comprising means removeably positioned around said wall member above said tabs extending from slots to hold said wall member against said support means positioned within said support means with said wall member.

19. The apparatus of claim 18 said means removeably positioned around said wall member comprises a strap-like band.

20. The apparatus of claim 14 wherein said rivets include a rivet passing through overlapping side edges of said wall member and through said base.

21. The apparatus of claim 15 wherein said rivets include a rivet passing through overlapping side edges of said wall member and through said base.

22. The apparatus of claim 1 wherein said tabs are formed of a deformable material to bend said tabs after said tabs have been inserted through said slots.

23. The apparatus of claim 22 wherein said base is formed of metal.

24. The apparatus of claim 13 wherein said tabs are formed of a deformable material to bend said tabs after said tabs have been inserted through said slots.

25. The apparatus of claim 24 wherein said base is formed of metal.

26. The apparatus of claim 15 wherein said tabs are formed of a deformable material to bend said tabs after said tabs have been inserted through said slots.

27. The apparatus of claim 15 wherein said base is formed of metal.

* * * * *

UNITED STATES PATENT AND TRADEMARK OFFICE
CERTIFICATE OF CORRECTION

PATENT NO. : 4,628,634

DATED : December 16, 1986

INVENTOR(S) : Oren B. Anderson

It is certified that error appears in the above-identified patent and that said Letters Patent is hereby corrected as shown below:

Column 9, line 32 (Claim 6), should be --tabs [and said flange top edge].--

Column 9, line 34 (Claim 7), "claim 5" should be --claim 6--;

Column 9, line 37 (Claim 8), "claim 5" should be --claim 6--.

Signed and Sealed this

Twenty-fourth Day of May, 1988

Attest:

DONALD J. QUIGG

*Attesting Officer*    *Commissioner of Patents and Trademarks*